No. 774,440. PATENTED NOV. 8, 1904.
E. F. LLOYD.
CONDUIT SYSTEM FOR CONNECTING GAS CONDENSERS.
APPLICATION FILED MAR. 5, 1904.
NO MODEL. 2 SHEETS—SHEET 1.
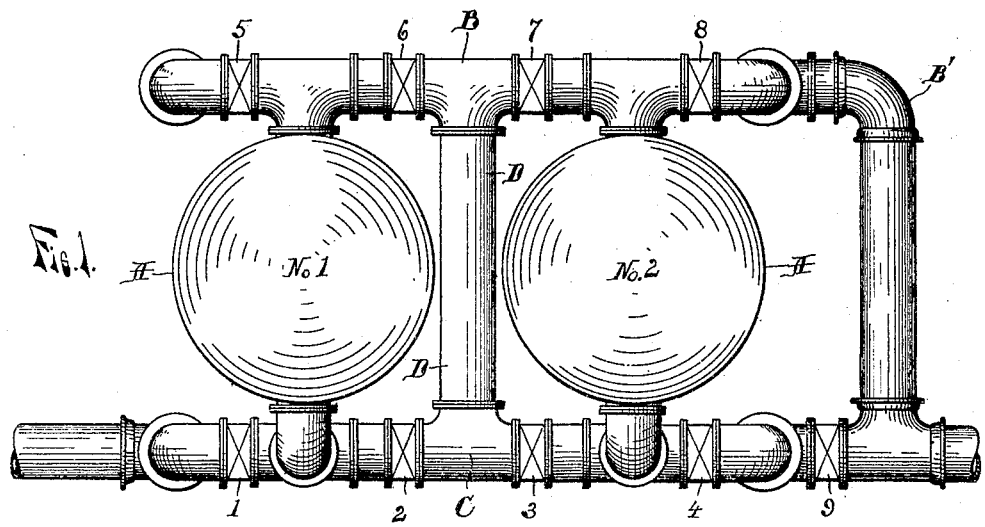
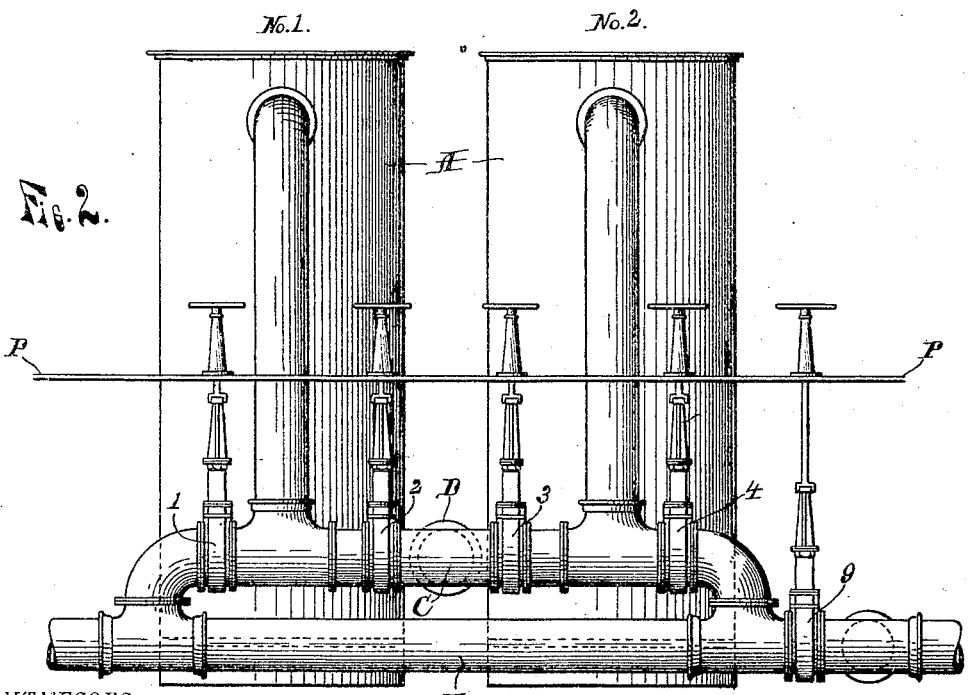
WITNESSES. INVENTOR.
Attorneys.

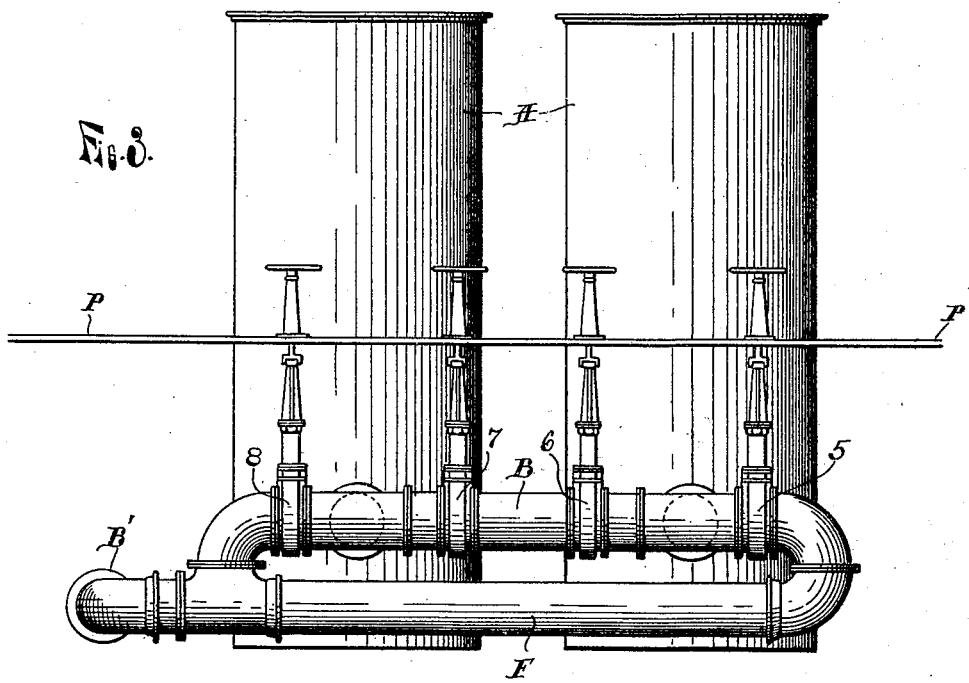

No. 774,440. Patented November 8, 1904.

UNITED STATES PATENT OFFICE.

ERNEST F. LLOYD, OF DETROIT, MICHIGAN.

CONDUIT SYSTEM FOR CONNECTING GAS-CONDENSERS.

SPECIFICATION forming part of Letters Patent No. 774,440, dated November 8, 1904.

Application filed March 5, 1904. Serial No. 196,738. (No model.)

*To all whom it may concern:*

Be it known that I, ERNEST F. LLOYD, a citizen of the United States of America, residing at Detroit, in the county of Wayne and State of Michigan, have invented certain new and useful Improvements in Conduit Systems for Connecting Gas-Condensers, of which the following is a specification, reference being had therein to the accompanying drawings.

This invention relates to pipe or conduit connections for condensers of various descriptions, and more particularly for condensers used in the manufacture of gas.

In modern gas plants producing daily enormous quantities of gas condensers of very large size must be employed for cooling the hot gas, and the pipe-conduits conveying it to and from the condensers must be correspondingly large, and since it has become very desirable in modern gas plants to have two condensers connected by a system of conduits and valves, whereby the two condensers may be connected in series, making either one first or permitting the use of either one alone, the arrangement of a suitable system of conduits and valves requires serious consideration.

The main object in using two condensers in modern gas plants is to prevent the accumulation of naphthalene, and as this condensation takes place in the colder one of the two, which in the usual course of operation will be the one second in series, by reversing the connection, and thus letting the hot gas into this cool one first, the naphthalene will be vaporized again and carried off. By a judicious manipulation of the reversing-valves it is thus possible to cool the gas without robbing it of one of its desirable constitutents. The conduits and valves as at present commonly arranged do not permit of this contingency of operation, since there is a multiplicity of widely-scattered valves and the system of conduits is too complicated to permit of any intelligent conception of its operation except by one who has become very familiar with it; and therefore it is the object of my invention to arrange the conduits and valves on a more simple and comprehensive plan involving a minimum of valves so placed that the operator in charge can inspect and operate them all from one point of vantage and can tell at a glance in what manner the condensers are connected and which of the valves must be opened or closed to effect the desired change in the connection of the condensers. At the same time my aim is to avoid long and complicated stretches of pipe-conduits and cumbersome supports therefor.

My improved system of connection accomplishes the objects desired in the manner hereinafter more fully described, and shown in the accompanying drawings, in which—

Figure 1 is a plan of two condensers with my improved conduit system applied thereto. Fig. 2 is a front elevation thereof, and Fig. 3 is a rear elevation of the same.

In the drawings, A A are two condensers of the upright type usually employed, each provided with an inlet for the gas near the top and an outlet near the bottom. These two condensers, which are designated as "No. 1" and "No. 2," are placed side by side, with a space between them, as shown, and the system of conduits and valves connecting the same is as follows: The two outlets are connected by a crossover B, which is in the same plane with the outlets, and the inlets are connected by a crossover C, which is U-shaped, the horizontal or middle portion of which is also in the same plane with the crossover B, and the two crossovers B and C are connected in the middle by the transverse crossover D. In front of the two condensers and in the same vertical plane with the crossover C, I place the supply-conduit E and connect the same by elbows or otherwise with the ends of the horizontal portion of the crossover C. In the rear of the condensers and in the same vertical plane with the crossover B, I place the exhaust-conduit F, which is connected with the ends of the crossover B and through a right-angle bend B' with the supply-conduit. I preferably support the supply and exhaust conduits directly upon the main floor and support, if necessary, the condensers upon a raised base just at the proper height to form the connection with the crossovers by ordinary T's or elbows, so that no extra supports for the conduits are needed, while at the same time it will be observed that the whole system of conduits may be built in this manner of commercial pipe and pipe connections. Each of the crossovers is provided with four valves. Those in the crossover C are numbered 1 2 3 4, and those in the crossover B are numbered 5 6 7 8. The valves 1 and 4 and 5 and 8 control the connections of the crossovers with the supply and exhaust conduits, and the valves 2 and 3 and 6 and 7 control the passage of the gas through the crossovers, the valves being placed symmetrically in said crossovers, as shown. The valves operate with their stems in vertical position and are preferably of the throughway type, having rising and falling valve-stems supported in suitable valve-stands upon a common platform P, erected at a suitable height above the valves.

The parts being arranged and constructed as shown and described, the operation is as follows: If valves 1, 3, 6, and 8 are opened and the others are all closed, the two condensers are connected in series with No. 1 first, and if valves 4, 7, 2, and 5 are opened and the others closed the condensers are connected with No. 2 first in the series. The reversal in series is thus effected by simply alternating the valves. Of the four valves 1, 2, 5, and 6, which are grouped around one condenser, and of the four valves 3, 4, 7, and 8, which are grouped around the other condenser, the two open valves in one group correspond with the two open valves of the other group and the two closed valves of the same group correspond with the two closed valves of the other group, thus making confusion impossible, since the reversing of the series is accomplished by reversing all of the valves— *i. e.*, by closing the two open valves and opening the two closed valves of each group. If the valves have rising valve-stems, the opened or closed positions of the valves will be indicated by the valve-stems; but if valves with non-rising valve-stems should be employed suitable indicators should be provided. It will also be seen that if the two valves 1 and 5 only or the two valves 4 and 8 only are opened only one of the two condensers is operatively connected.

By placing a valve 9 in the supply-conduit near its junction with the exhaust-conduit these two conduits may be connected by opening this valve, and by then closing the valves 1 and 4 both condensers may be cut out, if a contingency requiring such action should arise, without stopping the flow of the gas through the supply-conduit. The valve 9 may be of the same character and may be arranged to be operated from the same platform as the other valves; but it is preferably placed apart from the others which are regularly used.

My improvement accomplishes all of the objects set forth and more, since my system of conduits and valves is very cheap and simple, using in its construction not a single part which must necessarily be specially made for the purpose.

What I claim as my invention is—

1. The combination with two condensers of the character described, of a pipe-conduit comprising a crossover B connecting the outlets of the condensers in the horizontal plane thereof, an exhaust-conduit F below said crossover and communicating with said outlets through separate connections with said crossover, a U-shaped crossover C connecting the inlets of the two condensers and having its middle portion arranged in the same horizontal plane as the crossover B, a transverse crossover D connecting the crossovers B and C intermediate their ends, and a supply-conduit E extending horizontally below the crossover C and communicating with the inlet-openings of the condensers through separate connections with the horizontal portion of the crossover C, valves 1, 2, 3 and 4 in the horizontal portion of the crossover C and its connections with the supply-pipe and valves 5, 6, 7 and 8 in the crossover B and its connections with the exhaust-pipe.

2. The combination with two condensers of the character described, of a pipe-conduit comprising a crossover B connecting the outlets of the two condensers in a horizontal plane therewith and provided with the valves 6 and 7, an exhaust-conduit F below said crossover and communicating with said outlets through independent connections with said crossover, valves 5 and 8 in said connections, a U-shaped crossover C connecting the inlets of the two condensers and having its middle portion in the same horizontal plane with the crossover B and provided with valves 2 and 3, a transverse crossover D connecting the crossovers B and C midway of their length, a horizontally-extending supply-conduit E below the crossover C and communicating with the inlet-openings of the condensers through independent connections with the horizontal portion of the conduit C, valves 1 and 4 in the above connections, all of the above-named valves operating with their stems in a vertical position and having their valve-stands accessibly supported upon a common level by a platform.

In testimony whereof I affix my signature in presence of two witnesses.

ERNEST F. LLOYD.

Witnesses:
OTTO F. BARTHEL,
LEWIS E. FLANDERS.